June 24, 1930.  A. MOORE  1,766,676
CHARGE SUPPLEMENTING APPARATUS FOR INTERNAL COMBUSTION ENGINES
Filed March 7, 1927  4 Sheets-Sheet 1
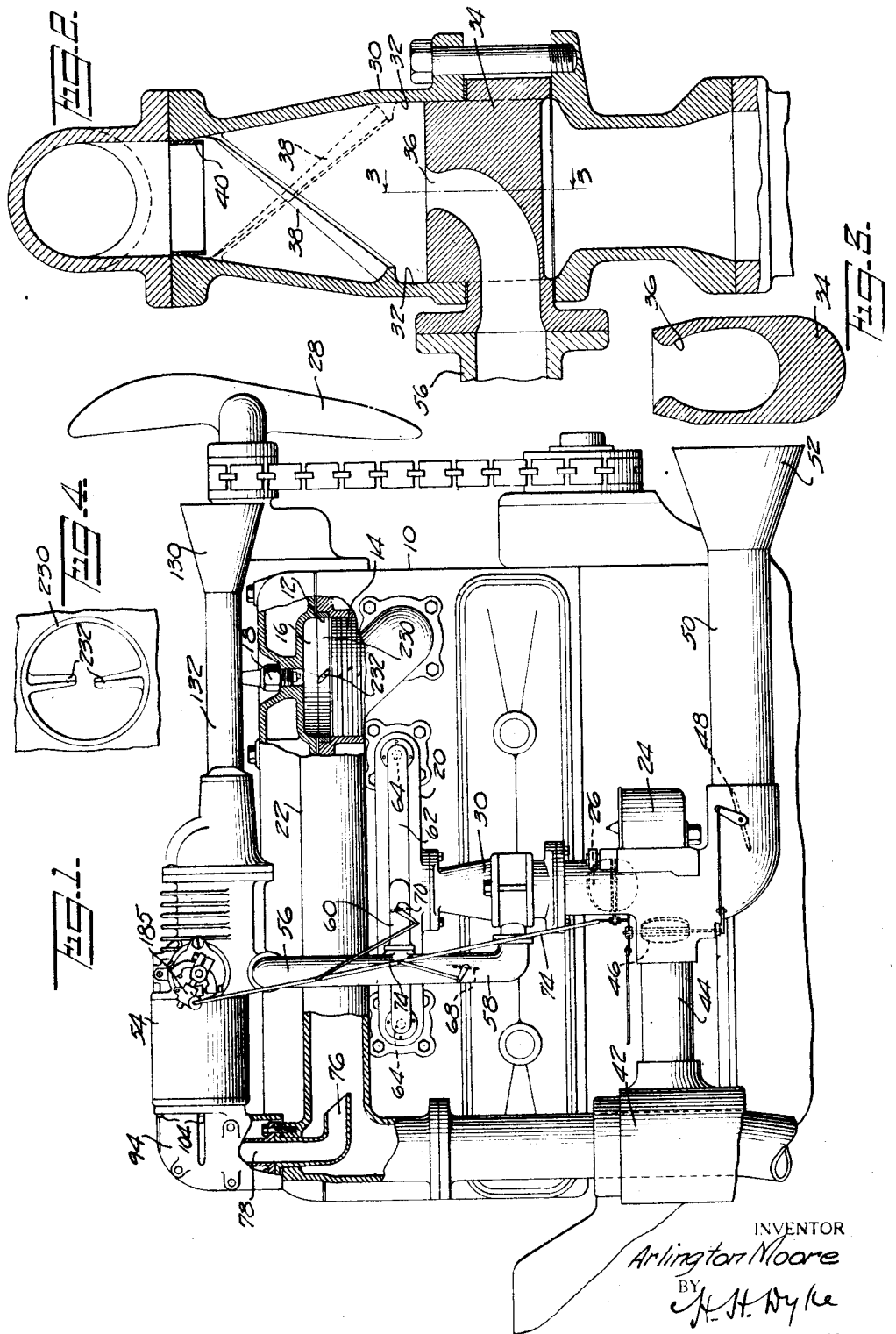
INVENTOR
Arlington Moore
BY
H. H. Dyke
ATTORNEY

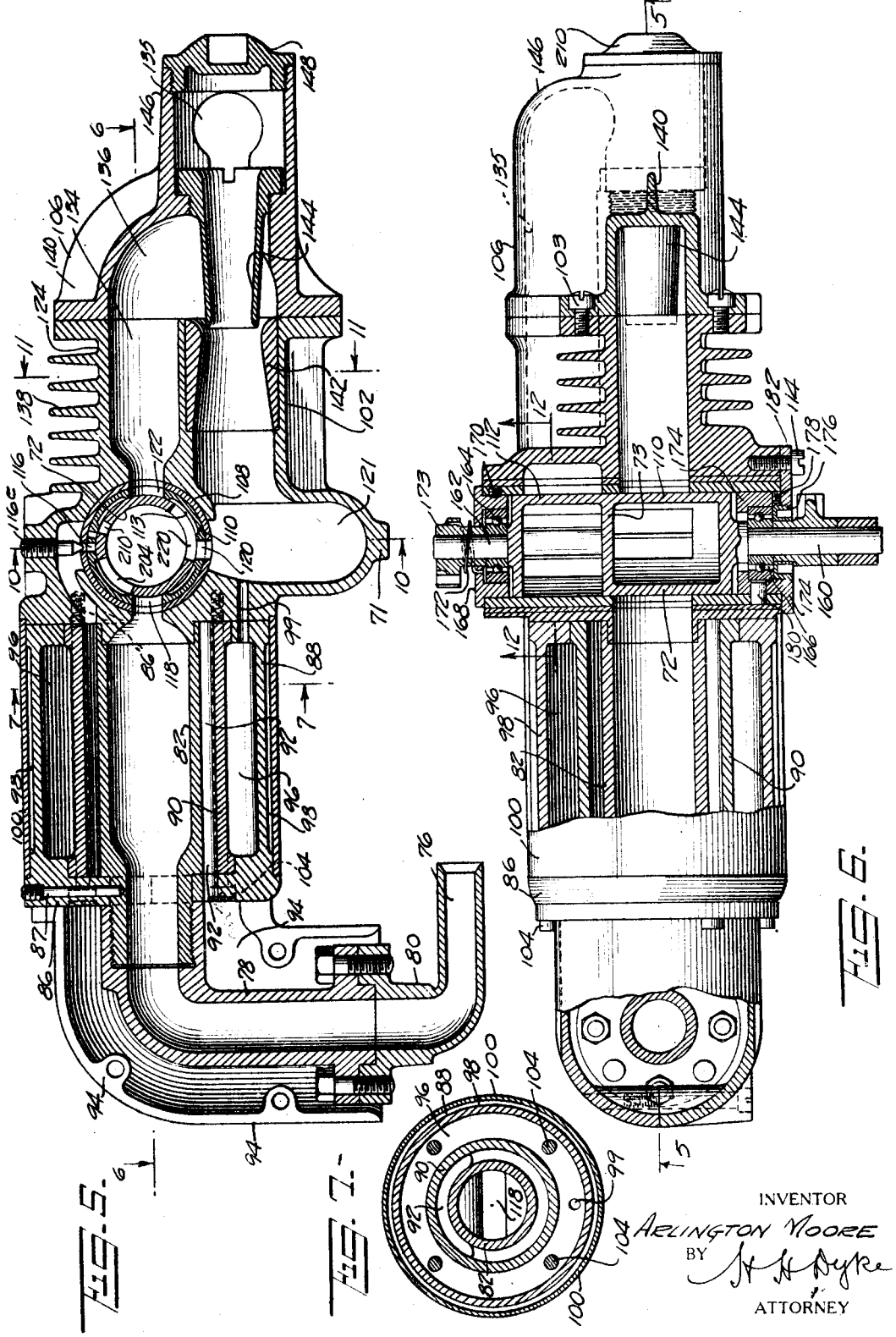

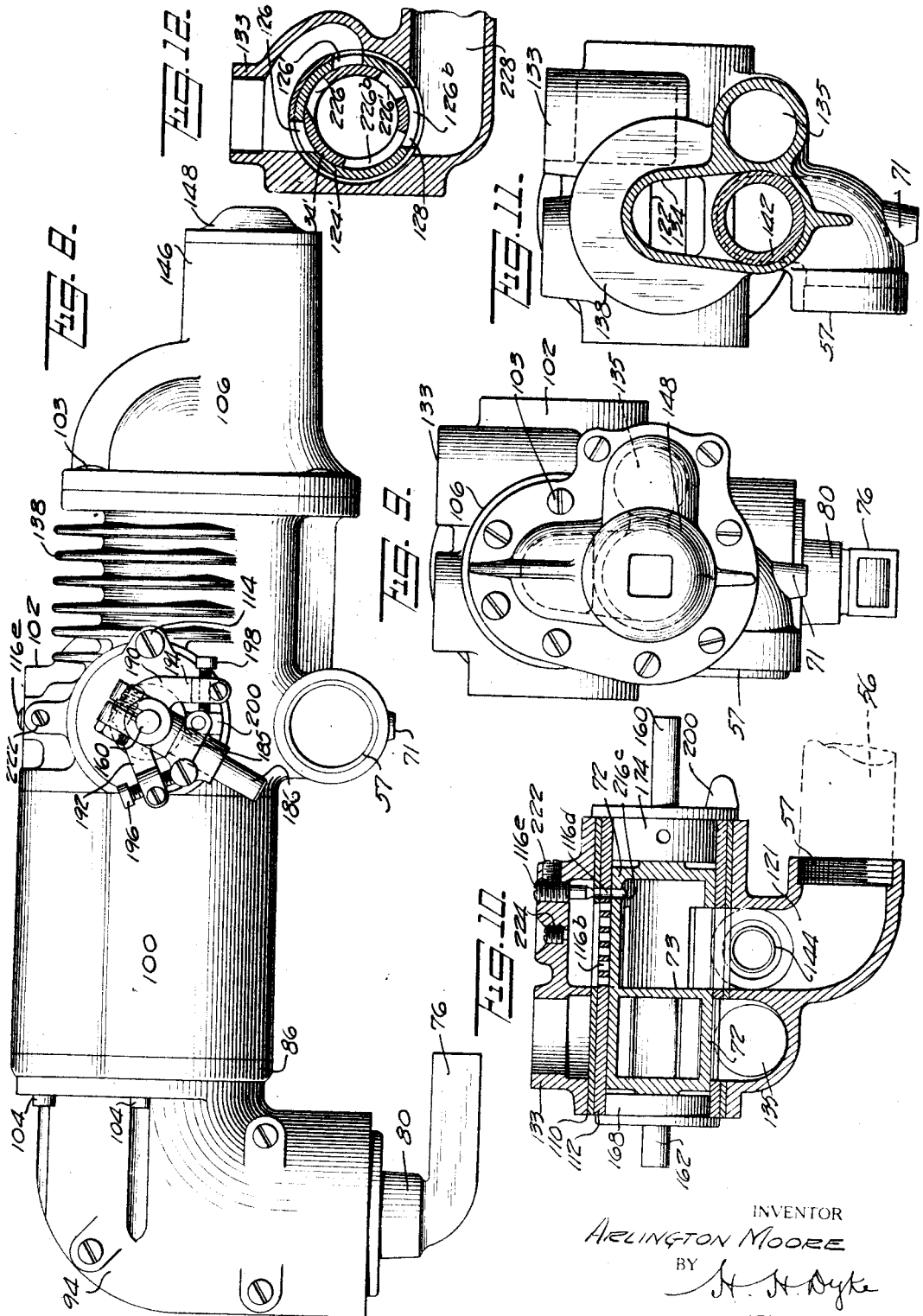
June 24, 1930. A. MOORE 1,766,676
CHARGE SUPPLEMENTING APPARATUS FOR INTERNAL COMBUSTION ENGINES
Filed March 7, 1927  4 Sheets-Sheet 3
INVENTOR
ARLINGTON MOORE
BY
H. H. Dyke
ATTORNEY

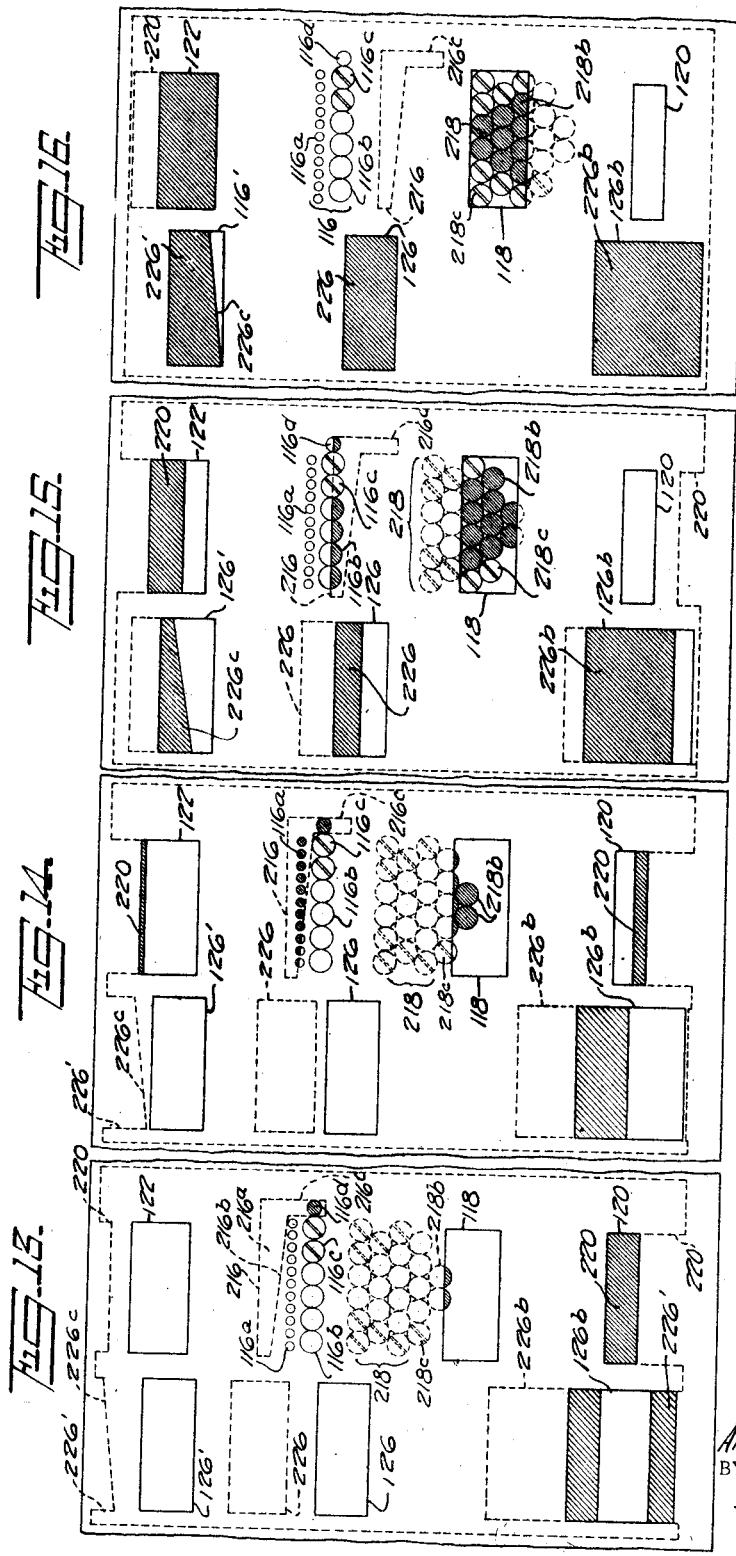

Patented June 24, 1930

1,766,676

UNITED STATES PATENT OFFICE

ARLINGTON MOORE, OF NEW YORK, N. Y., ASSIGNOR, BY MESNE ASSIGNMENTS, TO MAXMOOR CORPORATION, OF NEW YORK, N. Y., A CORPORATION OF DELAWARE

CHARGE-SUPPLEMENTING APPARATUS FOR INTERNAL-COMBUSTION ENGINES

Application filed March 7, 1927. Serial No. 173,388.

My invention relates to charge supplementer apparatus for internal combustion engines, and particularly to apparatus for delivery to the engine intake of charge material supplemental to the fuel and air stream supplied through the carburetor.

The invention will be best understood from the following description of an embodiment thereof.

The accompanying drawings of embodiments of the invention are for the purpose of affording an understanding of the invention and not for limitation of its scope.

In said drawings, Fig. 1 is a side elevational view, partly in section, of an internal combustion engine equipped with apparatus embodying my invention. Fig. 2 is a longitudinal sectional view of that part of the intake conduit next to the carburetor. Fig. 3 is a section on line 3—3, Fig. 2. Fig. 4 is a plan view looking down upon the cylinder bore. Fig. 5 is a vertical longitudinal sectional view of the charge supplementer, the section being taken on line 5—5, Fig. 6. Fig. 6 is a part plan and part sectional view thereof, the sectional portion being taken on line 6—6, Fig. 5. Fig. 7 is a section on line 7—7, Fig. 5. Fig. 8 is a side view of the supplementer, and Fig. 9 an end view thereof. Fig. 10 is a section on line 10—10, Fig. 5. Fig. 11 is a section on line 11—11, Fig. 5. Fig. 12 is a section on line 12—12, Fig. 6, and Figs. 13-16 are unrolled views showing four positions of the valve rotor for controlling the metering of exhaust gas and air, and in which hatched section lines indicate extent of registration between ports in the rotor (shown in dotted lines), and stationary ports (shown in full lines), controlled by turning the rotor with respect thereto.

The engine 10 is preferably a multi-cylinder 4-cycle engine consuming volatile liquid fuel, and has cylinders 12, pistons 14, combustion chambers 16, spark plugs 18, intake manifold 20, exhaust manifold 22, carburetor 24, throttle 26, and fan 28.

The gases from the charge supplementer, described below, are delivered to the intake conduit above the throttle and in the direction of the fuel and air stream from the carburetor. When such delivery or part thereof is performed within the intake conduit immediately or substantially immediately above the throttle, I preferably provide a special intake conduit member 30 of enlarged bore section, as indicated at 32, and insert therein, or between bolted together parts thereof, the crosshead member 34 containing the nozzle 36 for delivery of the supplemental gases in the direction of stream flow toward the engine cylinder. Crosshead member 34 is preferably of substantially stream-line section, as shown in Fig. 3, to avoid eddying and resistance to flow through the intake conduit bore past the opposite sides thereof. In striking the under side of member 34, dividing to pass to each side thereof, and having its parts reunited above member 34, the fuel and air stream from the carburetor has its components effectively mixed together and with the gases delivered through nozzle 36. Above the crosshead 34 the bore 32 of the intake conduit is preferably reduced gradually to the dimension of the intake manifold bore, and is preferably provided in such tapering region with substantially spiral or rifled mixing vanes 38, 38, and above these vanes a depending collar or thimble 40 is provided to divert into the gas stream any liquid fuel which may be adhering to the walls of the intake conduit, as when the carburetor air inlet is choked for starting. With such arrangement, the gases and fuel are thoroughly mixed, and all the charge components, including those delivered through nozzle 36, move together toward the engine cylinders.

The air supply to the carburetor air inlet is preferably controlled adjunctively to throttling, so that hot air is supplied thereto at low throttle openings, when intake pressure and initial cylinder pressure are relatively low; and cold air is supplied with driving force behind it when the throttle is opened wider for heavier load conditions and intake pressure is nearer to atmospheric. In the construction shown, the hot air for low throttle openings is taken from collar 100

42 surrounding the exhaust conduit, through the pipe 44, the butterfly valve 46 therein, which is interlinked with the throttle, being open under conditions of low throttle opening, while butterfly valve 48 in the cold air supply pipe 50, also interlinked with the throttle, is closed, whereas for wider throttle openings the cold air valve 48 opens as the hot air valve 46 closes. In this way, heat is supplied for assisting in vaporizing the fuel at partial throttle openings when it is beneficial, and the heat supply is reduced at times of wider throttle opening when it would reduce volumetric efficiency. The cold air may be driven toward the air intake in any convenient way, as, for example, it may be collected in funnel 52, exposed to wind velocity upon travel of the automotive device, as automobile, airplane, etc.

The charge supplementer, indicated generally by the reference character 54, supplies mixtures of exhaust gas and air to the engine intake above the throttle 26. Its delivery pipe 56, connected to the supplementer at 57, preferably has two branches, one branch 58 communicating with nozzle 36 described above, and the other branch 60 being connected to a secondary manifold 62, which discharges through jet openings 64 into the intake manifold toward the intake valve ports at points located relatively close up to such ports. These branches 58 and 60 are controlled by butterfly valves 68 and 70 respectively, which are also interlinked with the throttle, so that delivery of gaseous mixtures from the source of supplementary charge material for low throttle openings is through nozzles 64, 64, substantially direct to the engine cylinders, whereas for wider throttle openings delivery is changed to nozzle 36 substantially close down over the throttle.

As will be noted in connection with the charge supplementer 54, the gases delivered thereby are changed from hot exhaust gas and preheated air, which are supplied for low throttle openings, to cooled exhaust gas and cold air for wider throttle openings, so that heat is supplied when useful, and the heat supply is cut down when too much heat would reduce the volumetric efficiency. Furthermore, delivery of supplementary gases at nozzles 64 appears to produce a stratified charge and to permit running at low partial throttle openings on very lean mixtures, whereas with delivery at 36 during wider throttle openings, the high degree of homogeneity of charge components which is obtained by the longer travel of the gases through conduit member 32, the action of the mixing vanes 38, etc., is favorable for power development. The gases are also preferably subjected to agitation within the engine combustion chamber and cylinder, as described below.

The charge supplementer 54, from which the mixture of exhaust gas and air is supplied to the intake conduit, is a chambered body, preferably made up of several castings. It is preferably applied directly to the exhaust conduit and supported by its connection to the exhaust conduit and by a lug 71 adapted to rest on the exhaust manifold at a distance from the point of attachment, and comprises a valve rotor 72 linked to turn adjunctively with the movement of the throttle by link 74. Hot exhaust gas from the exhaust conduit is supplied to supplementer 54 through the impact of Pitot tube 76 having its open mouth exposed against the flow in the exhaust conduit.

For engine idling and low part throttle operation, these hot exhaust gases are caused to interchange some of their heat through metal walls with air, and metered quantities of the hot exhaust gas and air so preheated are admixed in the bore of the valve rotor and delivered hot through delivery pipe and branch 60 to the intake manifold through nozzle 64. For wider throttle openings the preheated air supply is shut off, and the hot exhaust gas is sent through a cooler and admixed with cold air supplied from a source of driven cold air, and the resulting cold mixture of cooled exhaust gas and cold air is sent through delivery pipe 56, branch 58 thereof, and nozzle 36 into direct admixture immediately over the throttle with the fuel and air stream from the carburetor.

Where the supplementer is disposed substantially parallel to the exhaust manifold, as shown herein, impact tube 76 is preferably bolted to an elbow member 78 by equidistant bolts, so that it can be turned into proper position to have its open mouth face against the flow of the exhaust gas stream, and is bolted to the exhaust manifold with its taper shank 80 received in a taper hold formed in the wall of the exhaust manifold. Elbow 78 is screwed onto a stove 82 having the chamber 84 therein enlarged to produce relatively slow travel of exhaust gas therethrough, thereby facilitating heat exchange. Stove 82 sets in a hole in the bottom part 86 of the cup-shaped casting 88 and is held in place therein by the dowel 87. A cylindrical shell 90 received in the casting 88 surrounds stove 82 and an air passage 92 is provided therebetween, in which warm air taken from near the exhaust manifold is heated after passing through the split shell 94 surrounding the hot elbow member 78. Heat is conserved by the insulating recesses 96 and 98, the former being located between shell 90 and the wall of casting 88, and the latter between said wall and the jacketing shell 100. Recess 96 is vented to the supplementer delivery passage by the duct 99.

The casting 102 is attached to the end of casting 88 by through bolts 104 extending throughout the length of casting 88. This central casting part 102 contains the rotary metering valve, parts of the exhaust gas cooler and of the cold air aspirator, and the delivery connection. Casting 106 is in turn secured to casting 102 by screws 103, and contains the remainder of the cooler and cold air aspirator respectively.

The central casting 102 has a transverse bore 108 preferably lined by a bushing 110 having a force fit therein. The metering valve assembly comprises an outer sleeve 112 containing the rotor 72 and such assembly is removable as a unit by taking out screw 114. Recesses 113 provided in sleeve 112 reduce the area of contact between sleeve 112 and rotor 72. When the metering valve is in place, the port openings in sleeve 112 register with corresponding openings in the bushing 110 which are extensions of ports formed in casting 102, and provide the stationary ports of the metering device. Casting 102 preferably has a lug 71 formed therein adapted to rest on the exhaust manifold and assist in supporting the supplementer on the engine.

There are two sets of stationary port openings for cooperating with ports in the hollow rotor 72, one set at one side of the partition 73 in the hollow rotor 72, for regulating the metering and delivery of exhaust gas and preheated air, and a second set on the opposite side of said partition for metering the supply of cold air. The ports of the first of said sets are four in number and comprise port 116 from the preheated air passage 92, port 118 from the bore 84 of the exhaust gas stove 82, port 120 leading to the delivery passage 121, to which delivery pipe 56 is connected, and port 122 leading into the exhaust gas cooler 124. The second set of stationary ports for controlling the passage of cold air comprises the two-part inlet port openings 126 and 126', and the outlet port 128, which is of area substantially equal to the combined areas of the partial inlet ports 126 and 126'. See Fig. 12.

The cold air is preferably supplied with driving force behind it. As shown same is collected by funnel 130 exposed to the blast of the engine fan 28, and is supplied to the metering apparatus through pipe 132, connected to inlet opening 133 and is metered through the cold air ports by rotor 72.

A novel feature of the present apparatus consists in the provision of a completely inbuilt cold air conduit and aspirator, formed in the same casting sections with the exhaust gas cooler, thus greatly simplifying the construction, dispensing with objectionable appendages, making provision for obtaining an ample supply of cold air, and providing for convenient interchange of different sized aspirator nozzles and venturi tubes. The exhaust gas cooler comprises the passage 134 extending outwardly in the casting 102 and the return bend 136 in casting 106, and these parts are provided with heat radiating fins 138 and 140 respectively. After passing throug the venturi tube 142 surrounding the cold air nozzle 144, the cooled exhaust gas is delivered through outlet 121 to the delivery pipe 58. Upon merely disconnecting the section 106, the venturi tube 142 can be expeditiously replaced by one that is somewhat smaller or larger, as may be desired.

The cold air after passing the metering valve, passes outwardly through the cold air passage 135 leading to the aspirator nozzle 144, and after being aspirated by the exhaust gas through nozzle 144 and becoming admixed therewith in the venturi tube 142, is delivered therewith at 121 to the delivery tube 56.

These parts are so constructed that the cold air aspirating nozzle 144 can be readily taken out and replaced by another of any desired size. With the construction shown, the casting 106 is extended, as indicated at 146, to include the cold air passages 135 and 136, and the aspirator nozzle 144 is screwed into place through an opening later closed by the plug 148. To change to a different sized cold air aspirator nozzle 144, it is only necessary to remove the plug 148, whereupon the desired change can readily be made. To change the venturi tube 142, casting 106 is disconnected, as already described.

It will be seen that the construction of the cold air passages and aspirator is simple, that size changes are readily made, and that the air and exhaust gas travel is through easy, sweeping passages, and that with this construction embodying a "giant" aspirator, an ample supply of cold air is aspirated along with the exhaust gas.

The rotor 72 has shaft extensions 160 and 162 at its opposite ends, on which it turns in the ball bearings 164 and 166. The cup 168 containing bearing 164 is held in place in sleeve 112 by set screw 170. A light coil spring 172, having one end anchored in cup 168 and the other end secured to a split collar 173 bolted on shaft portion 162, tends to return the rotor 72 to closed position.

The other ball bearing 166 is retained in a collar 174, fitted into sleeve 112, by a nut 176 screwed into the collar and locked by a set screw 178. Collar 174 is secured in sleeve 112 by a dowel 180 inserted from the side before the rotor and sleeve assembly is inserted in bushing 110. When so inserted, the metering valve assembly is fastened in place by the screw 114 passed through a laterally projecting ear 182 of collar 174, and can be readily removed upon taking out screw 114.

The link 74 operated from the throttle crank and serving to operate rotor 72 is connected at 184 to a split collar 185 adjustably bolted to crank arm 186 so as to be adjustable in and out on said crank and to regulate the throw of rotor 72 corresponding to the opening and closing of the throttle. Crank arm 186 has a split and bolted on connection to the shaft extension 160 of rotor 72.

Behind the connection of crank arm 186 thereto, shaft extension 160 of rotor 72 is provided with a stop yoke 190 having two stop arms 192, 194 provided with adjustable stop screws 196, 198 to limit the movement of rotor 72 by contact with a stop lug 200 projecting from the bearing collar 174.

Three ports 216, 218 and 220 in valve rotor 72 cooperate with the four stationary ports 116, 118, 120 and 122 for control of exhaust gas and preheated air. Valve port 216 cooperates with stationary preheated air port 116, valve port 218 with hot exhaust gas supply port 118, and the third valve port 220 cooperates with the two stationary ports 120 and 122, through which pass respectively the mixture of hot exhaust gas and preheated air direct to the delivery pipe 56, and the exhaust gas or mixture of exhaust gas and air indirectly to delivery pipe 56 through the cooler.

The stationary air port 116 preferably comprises a first row of fine holes 116$^a$ and a second row of larger holes 116$^b$, some of which holes 116$^b$ may be shut off by inserted screw plugs 116$^c$ in order to regulate the extent of the port opening for passage of preheated air. The hole 116$^d$ preferably located at one end of the row of holes 116$^b$ is for passage of preheated air at idling, and its extent of opening is adjustable to secure best results by means of a set needle valve screw 116$^e$, the head whereof is conveniently accessible on the exterior of the supplementer casing; screw 116$^e$ is locked in adjusted position by the set screw 222. A plugged screw hole 224 is preferably located alongside the set screw 222 for permitting the application of a cleaning or oiling fluid when desired.

The rotor port 216 for coacting with the openings making up the stationary preheated air port 116 has the form of an elongated slot 216$^a$ with an inclined or cleaver leading or front edge 216$^b$, and an advance slot leg 216$^c$. At idling, the slot part 216$^c$ uncovers the idling hot air hole 116$^d$ only, and upon turning the rotor as the throttle is partially opened, the port holes are gradually opened up, the fine holes 116$^a$ being first opened, and then the larger holes 116$^b$. This transition can be readily traced across views 13, 14 and 15. Fig. 16 shows the position for wide open throttle at which the port 116 has been passed over by port 216 and the preheated air shut off. The preheated air admitted to the interior of the rotor through ports 116, 216 and the hot exhaust gas admitted thereinto through the ports 118, 218, are admixed together and pass to delivery passage 121 and thence to delivery pipe 56 through ports 120 and 220.

Stationary port 118 for supply of hot exhaust gas is preferably of rectangular formation, and the rotor port 218 coacting therewith is preferably made up of closely spaced holes 218$^b$ drilled in the rotor and screw threaded to allow insertion of screw plugs 218$^c$ to reduce the opening area, which is initially preferably made oversize to permit reduction by screw plugs to the dimension and shape giving best results with the particular engine, and to get the desired proportion of exhaust gas at all stages of engine operation. It is arranged for gradual opening up, the advance row of holes as shown comprising only two holes 218$^b$, 218$^b$, whereas the succeeding rows contain several additional holes. The stages of opening of such port can be traced across Figs. 13–16, and it will be noted that the exhaust gas supply port is open first slightly and then more widely throughout the entire range of throttle opening.

Rotor port opening 220 serves during the early portion of turning of rotor 72 to open up the stationary delivery port 120 for delivery of hot exhaust gas and preheated air to outlet passage 121 and delivery pipe 56, and as outlet port 120 is gradually closed off the rotor port 220 serves to open up the stationary exhaust gas outlet port 122 to the cooler passage 134, and said port 122 leading to the cooler is completely open at wide open throttle. See Fig. 16.

As has been noted, the stationary port for entry of cold air is divided into two parts 126 and 126′ for convenience of construction and to enable its complete opening to be obtained within a relatively short swing of crank arm 186, and a single port opening 126$^b$ is provided for egress of cold air from the metering mechanism.

The rotor 72 has corresponding ports 226 and 226′ for inlet and 226$^b$ for egress of cold air to the cold air conduit 135 leading to aspirator nozzle 144.

As cold air is not supplied at low partial throttle openings, ports 126 and 126′ are closed in the part throttle showing of Figs. 13 and 14, and are shown partly open in Fig. 15 and further open in the wide open throttle position of Fig. 16.

The advance edge 226$^c$ of port opening 226′ is preferably inclined to obtain a gradual increase of the first opening of the cold air while the transition from preheated air to cold air is in progress and as is clearly indicated in Fig. 15.

Internal vanes are provided within the combustion chamber for imparting cyclonic agitational movement to the gases on the intake stroke and to the confined gases on the compression stroke. As shown, a ring 230 is inserted in a groove at the top of the cylinder bore and this ring is provided with inclined vanes 232 for this purpose.

The operation of the supplementer apparatus described is briefly as follows: At idling, a mixture of hot exhaust gas and preheated air is supplied metered respectively through the advance row of exhaust gas port holes 218$^b$ and the idling air opening 116$^d$ and this mixture passes through the wide open ports 120, 220 to pipe 56, and butterfly valve 68 being closed and butterfly valve 70 open, is delivered to the intake manifold through nozzles 64. The metering port relations for idling will be clear from Fig. 13. Supply of preheated air for idling is regulated by means of screw needle valve 116$^e$.

With a further partial opening of the throttle, and corresponding movement of the metering rotor, the metering ports occupy positions as exemplified in Fig. 14. The preheated air ports and hot exhaust gas ports open up further and the resulting mixture is delivered as at idling, except that some part of the mixture passes through the port 122, which is now opening up.

With still further turning of the throttle and metering rotor and directing butterfly valves, there is a transition from preheated to cold air, as exemplified in Fig 15, the preheated air port being gradually closed off as the cold air port is opened, the direct outlet to the delivery pipe through port 120 is cut off and the exhaust gas, with preferably a small proportion of preheated air, is sent through the cooler by port 122, and the cooled exhaust gas and cold air aspirated therewith are delivered to the intake conduit partly at nozzles 64 and partly at 36, the butterfly valves 70 and 68 both being partially open.

At and near wide open throttle the port relations are substantially as shown in Figs. 1 and 16, the preheated air being shut off and the supplemental gases consisting entirely of cooled exhaust gas and cold air supplied past the open butterfly valve 68 and delivered to the intake through nozzle 36.

The gases from the supplementer and the fuel and air stream from the carburetor are admixed and set into agitation by vanes 38, 38 and are further agitated and admixed with the unscavenged gas remaining in the engine by the internal vanes 232.

The butterfly valves 68 and 70 can be dispensed with when desired by providing separate delivery pipes from the supplementer to the secondary manifold 64 and to the crosshead 34 controlled by registration of rotor port 220 with stationary ports 120 and 122 respectively.

Among the beneficial results secured with the use of apparatus utilizing the principles of my invention are that mechanical spark advance can be dispensed with because of the increase in violence of agitation of the confined gases and speeding up of flame propagation as the engine speed is increased, elimination or practical elimination of detonation by the inert nitrogen, carbon dioxide and water vapor of the exhaust gas supplied to the cylinders, making it practicable to cut down the clearance space and raise the compression ratio to 6:1 or more while using ordinary fuel of which present day gasoline is a typical example, the securing of practically complete combustion with practically no products of incomplete combustion or dissociation, such as carbon monoxide, modification of the Otto cycle in the direction of reduction of the ratio of maximum to mean effective pressures, economy in the use of fuel with increase of power delivery, reduction of pumping losses, elimination of crank case dilution, and general all round improvement in efficiency of operation.

Changes and modifications which may be resorted to within the scope of my claims are included within the invention.

I claim:

1. In an internal combustion engine, means for metering and admixing exhaust gases of the engine and air, means for conveying said mixed gases to the engine intake close up to the intake ports and over the engine throttle, and means operated adjunctively to engine throttling for controlling said second named means to deliver said mixed gases to the engine intake either close up to the intake ports or substantially immediately over the engine throttle.

2. In an internal combustion engine, means operated adjunctively to throttling for admixing and metering exhaust gases of the engine and air, means for conveying said mixed gases to the engine intake near the intake ports and to a point over the throttle, and means also operated adjunctively to throttling for controlling the passage of said mixed gases through said conveying means and coordinated to deliver said mixed and metered gases to the engine intake near the intake ports at low throttle openings and substantially immediately over the throttle at wider throttle openings.

3. In an internal combustion engine, means for heating air, means for metering and admixing hot exhaust gas and said preheated air, means for conveying same to the engine intake at low partial throttle openings near the intake valve ports, and means having elements in common with the second named means for cooling the exhaust gas and aspirating cold air with the exhaust gas at wider throttle openings, means for conveying same to the intake conduit substantially immediately over the throttle, and means for controlling the passage of the mixed gases through said several conveying means.

4. In an internal combustion engine, means for admixing and metering exhaust gas and air, means for supplying exhaust gas and air thereto in heated condition, means for supplying exhaust gas and air thereto relatively cold, means for conveying said mixed gases to the engine intake and supplying same to the engine intake hot for low partial throttle openings and cold for wider throttle openings, means for supplying hot air to the carburetor air intake, means for supplying cold air thereto, and means operated adjunctively with the first named means for supplying hot air to the carburetor air intake during low partial throttle openings and cold air for wider throttle openings.

5. Supplementer apparatus for internal combustion engines, comprising a hollow casing with inlets for exhaust gas and for hot and cold air and an outlet for delivery to the engine intake, a rotary valve in said casing for controlling the gas ports, an aspirator operated by the exhaust gas for aspirating cold air therewith, and said casing having an inbuilt passage therein from the cold air inlet to said aspirator.

6. In a supplementer for supplying supplementary gases to the intake conduit of an internal combustion engine above the throttle, comprising a three-part casing, one part containing heat interchange means for exchange of heat between hot exhaust gas and air, whereby the air is heated, a second part containing a rotary metering apparatus, a cooler and a gas delivery connection, and a third part containing a cold air passage, an aspirator and a return conduit for the exhaust gas and cold air.

In testimony whereof, I have signed my name hereto.

ARLINGTON MOORE.